340-870.15 SR
OR 2,675,540
SEARCH ROOM

April 13, 1954 H. B. SCHULTHEIS, JR 2,675,540

MULTICHANNEL TELEMETERING SYSTEM

Filed June 21, 1948

INVENTOR
H. B. SCHULTHEIS, JR.

BY [signature]

ATTORNEY

Patented Apr. 13, 1954 2,675,540

UNITED STATES PATENT OFFICE 2,675,540

MULTICHANNEL TELEMETERING SYSTEM

Harry B. Schultheis, Jr., Pacoima, Calif., assignor to Bendix Aviation Corporation, South Bend, Ind., a corporation of Delaware Application June 21, 1948, Serial No. 34,297

3 Claims. (Cl. 340—184)

This invention relates to telemetering by either radio or wire circuit and has particular application to systems of the type in which a carrier wave is modulated with one or more signal waves of sub-carrier frequency, and the frequency of the signal wave is varied in accordance with the measurement to be transmitted.

An object of the invention is to increase the information-transmitting capacity of a telemetering system of this type without increasing the number of signal waves.

Other more specific objects and features of the invention will become apparent from the detailed description to follow:

Briefly, the invention resides in introducing abrupt frequency shifts of predetermined magnitude into the signal waves to convey information of the "yes" or "no" type. Such a frequency shift does not obscure or impair the intelligence that is normally transmitted by gradual and continuous variations in the frequency of the signal, because the recorded trace or curve showing the frequency changes is simply displaced into another path parallel to that it would have taken had the "yes" or "no" signal not been transmitted.

Figure 1:
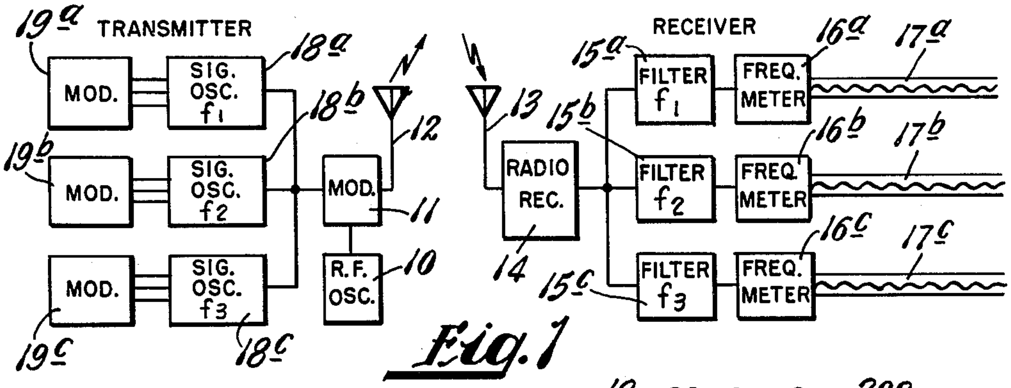
Fig. 1 is a block diagram illustrating the main essential elements of a telemetering system of the type to which the invention is adapted.

Referring first to Fig. 1, the complete telemetering system there depicted comprises a transmitter and a receiver which are connected by a radio link. The transmitter includes a radio frequency oscillator 10 which is modulated with one or more signal waves in a modulator 11, and the resultant wave is transmitted from an antenna 12. At the receiving station the radio wave is received on an antenna 13, detected in a radio receiver 14, and the detected signal waves are applied through a plurality of filters 15*a*, 15*b* and 15*c* to a plurality of recording frequency meters 16*a*, 16*b* and 16*c* which respectively produce records 17*a*, 17*b* and 17*c*.

Referring again to the transmitter, the signal waves that are applied to the modulator 11 are of the frequency-modulated type, i. e., the information or intelligence is represented by variations in the frequency of the wave. Signal waves of three different frequencies are generated by three different signal oscillators 18*a*, 18*b* and 18*c* and applied to the modulator 11. The frequency of each of the signal oscillators is in a different range of frequencies from the others and is capable of being varied within its range by a modulating unit 19*a*, 19*b* or 19*c*, respectively. The modulating units 19 may be associated with the instruments, the readings of which are to be telemetered to the distant receiving station.

In accordance with prior practice, each of the modulators 19 would include only a single means for varying the frequency of its associated signal oscillator 18 within the range limits thereof.

In accordance with the present invention each modulator 19 includes a first means for continuously varying the frequency of the associated oscillator in accordance with a reading to be transmitted, and also one or more means for discontinuously varying the frequency to a predetermined fixed extent, so that not only a continuously variable reading, but also a plurality of discontinuous "yes" or "no" type readings, can be transmitted on the same signal wave.

Figure 2:
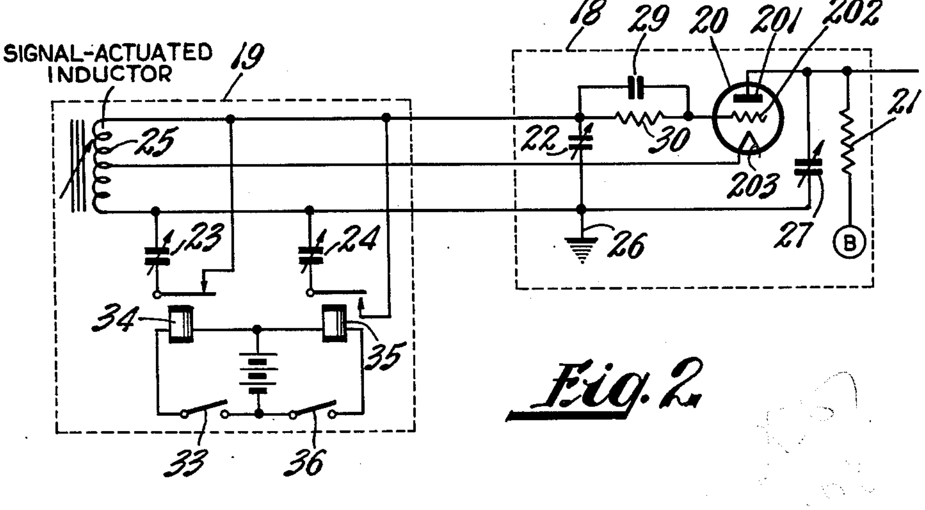
Fig. 2 is a schematic circuit diagram showing circuits for practicing the present invention in a system of the type shown in Fig. 1.

Referring now to Fig. 2, each of the signal oscillators 18 is shown as comprising a three-electrode vacuum tube 20, having an anode 201, a control grid 202 and cathode 203. Anode potential is supplied to the anode 201 through a resistor 21 from a source of B potential, and the cathode 203 may be heated indirectly by a heater, the circuit of which is omitted in the interests of simplicity. The frequency-determining circuit of the oscillator includes a tuned circuit having as essential elements a condenser 22 in the oscillator 18, and a condenser 23, a condenser 24, and an inductor 25 in the modulator 19. One terminal of the tuned circuit is connected to ground at 26 and is connected to the anode 201 through a condenser 27. The cathode 203 is connected to a tap on the inductance element 25. The other side of the tuned circuit is connected through a condenser 29, shunted by a leak resistor 30, to the control grid 202 of the tube 20. Such a circuit is the well-known Hartley oscillator and will oscillate at a frequency determined principally by the reactances of the inductor 25 and of the condensers 22 and/or 23 and/or 24. It will be noted that condenser 22 is permanently connected in the circuit, but that the condensers 23 and 24 are connected by relay contacts so that they can be subtracted from or added to the circuit at will, in accordance with the "yes-no" intelligence to be transmitted.

The inductor 25 is shown as being of the continuously variable type, and such elements are in common use in telemetering, being used to produce continuous inductance changes in proportion to continuous variable readings to be transmitted.

It will be understood, of course, that if desired the inductor 25 could be left constant and a continuous variation could be produced by varying the condenser 22.

However, it may be assumed that in the present instance a continuous variable reading is caused to continuously control the inductor 25 to vary the frequency of the signal oscillator. Further let it be assumed that the transmitter of the telemetering system is on a pilotless airplane having a roll gyro for stabilizing it, and that it is desired to receive at the receiving station on the ground a record showing the attitude of the airplane on its roll axis as indicated by the movements of the roll gyro. Obviously, by causing the movement of the roll gyro to actuate the variable inductor 25, a record can be produced on the ground, in accordance with Fig. 3, in which the line 32 represents the movements of the roll gyro.

Let is also be assumed that it is desired to have a record of the periods during which right rudder is applied on the plane during flight, and the periods during which left rudder is applied. In accordance with the present invention, this can be done by causing (Fig. 2) actuation of the right rudder to close a switch 33 in an actuating circuit of a relay 34 which controls the connection of the condenser 23 in the oscillator circuit, and by causing actuation of the left rudder to close a switch 36 in the actuating circuit of a relay 35 which controls the connection of the condenser 24 in the oscillator circuit. Although the condensers 23 and 24 are shown in Fig. 2 as being of the variable type, it is to be understood that during a flight these condensers will remain in fixed position of adjustment, so that actuation of the switch 33 removes a fixed amount of capacitance from the oscillator circuit, and actuation of the switch 36 adds a fixed amount of capacitance to the oscillator circuit.

The result is (referring to Fig. 3) that when the switch 33 is closed by the application of right rudder, the condenser 23 is cut out of the circuit thereby increasing the frequency of the signal wave by a fixed amount, as indicated at 37 in the record. When right rudder is released, the record trace drops back to the value it would have if the right rudder had not been applied at all. When left rudder is applied, the closure of the switch 36 cuts the condenser 24 into the circuit which lowers the frequency of the signal current, causing the trace to drop below its normal value, as indicated at 38, and when left rudder is removed the trace again resumes its normal position.

It will be noted that the application of right rudder deflects the record curve upwardly a small amount, and that application of left rudder deflects the curve downwardly a larger amount. Obviously, the two records are distinguishable without causing them to go in opposite directions, because of their having different magnitudes. Such a result could be obtained by having both the condensers 23 and 24 either normally in or normally out of the circuit. On the other hand, when right rudder produces upward deflection, and left rudder produces a downward deflection, as shown, it is not essential that they be of different magnitudes in order that they be distinguishable.

It will be obvious that by employing condensers some of which are normally in and some of which are normally out of the circuit, and by making the condensers of different values, more than two indications of the "yes" or "no" type can be superimposed on a single record of a continuously varying function without destroying the record value of the latter.

Figure 3:
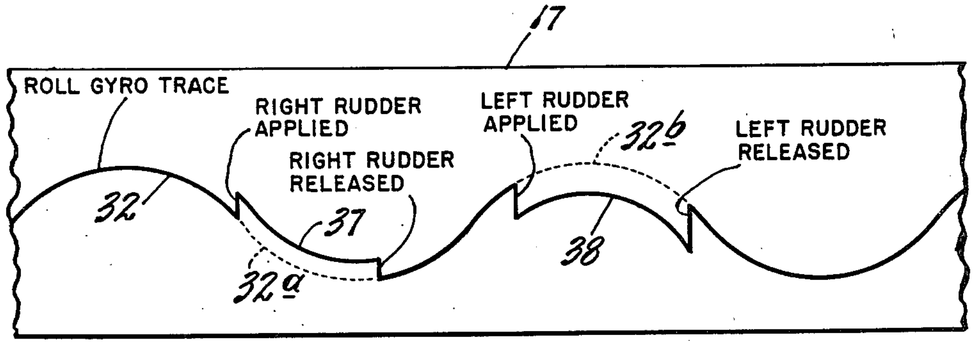
Fig. 3 is a section of a record produced at the receiving station in Fig. 1, illustrating the operation of the present invention.

In Fig. 3 the dotted lines 32a and 32b indicate the position that the record line 32 would have occupied if the rudder signals had not been superimposed on the roll gyro signal. It will be observed that each dotted section 32a and 32b is uniformly displaced, or in other words, is parallel to the adjacent portion of the trace 37 or 38, and this fact makes it possible for the user of the record to reconstruct those portions of the main curve where the "yes" or "no" signals are superimposed.

Although for the purpose of explaining the invention, a particular embodiment thereof has been shown and described, obvious modifications will occur to a person skilled in the art, and I do not desire to be limited to the exact details shown and described.

I claim:

1. In a telemetering system having a receiving station for producing a record of the frequency of a received signal: a transmitting station having an oscillator for generating a signal wave, means for modulating the frequency of said oscillator in accordance with a first reading that is continuous, and variable in value; means for abruptly shifting the frequency of said oscillator a fixed constant amount for a variable period of time corresponding to continuance of a second discontinuous "yes" or "no" type reading of variable duration; and means for transmitting the signal wave.

2. In a telemetering system having a receiving station for producing a record of the frequency of a receiving signal wave: a transmitting station having an oscillator for generating a signal wave; means for modulating the frequency of said oscillator in accordance with a first reading that is continuous, and variable in value; means for abruptly shifting the frequency of said oscillator a first fixed constant amount for a period of time corresponding to the continuance of a second discontinuance "yes" or "no" type reading of variable duration; means for shifting the frequency of said oscillator a second fixed constant amount different from said first fixed constant amount during continuance of a third discontinuous "yes" or "no" type reading of variable duration; and means for transmitting the signal wave.

3. In a telemetering system having a receiving station for producing a record of the frequency of a received signal wave; a transmitting station having an oscillator for generating a signal wave; means for modulating the frequency of said oscillator in accordance with a first reading that is continuous, and variable in value; means for abruptly shifting the frequency of said oscillator a fixed constant amount in one direction during continuance of a second discontinuous "yes" or "no" type reading of variable duration; means for abruptly shifting the frequency of said oscillator a fixed constant amount in the other direction during continuance of a third discontinuous "yes" or "no" type reading of variable duration; and means for transmitting the signal wave.

References Cited in the file of this patent

UNITED STATES PATENTS

| Number | Name | Date |
|---|---|---|
| 1,917,995 | Polin | July 11, 1933 |
| 1,928,969 | Kuffel | Oct. 3, 1933 |
| 2,042,490 | Zahl | June 2, 1936 |
| 2,403,603 | Korn | July 9, 1946 |
| 2,464,612 | Rich | Mar. 15, 1949 |